United States Patent [19]

Krascella

[11] 4,051,005
[45] Sept. 27, 1977

[54] PHOTOLYTIC PRODUCTION OF HYDROGEN

[75] Inventor: Nicholas Leo Krascella, Manchester, Conn.

[73] Assignee: United Technologies Corporation, Hartford, Conn.

[21] Appl. No.: 725,303

[22] Filed: Sept. 21, 1976

[51] Int. Cl.² ............................................... B01J 1/10
[52] U.S. Cl. ...................... 204/157.1 R; 204/157.1 H
[58] Field of Search ................. 204/157.1 R, 157.1 H; 423/648

[56] References Cited

U.S. PATENT DOCUMENTS 3,649,493   3/1972   Meiners et al. ............... 204/157.1 R
3,995,016   11/1976  Kittle ............................. 423/648 R Primary Examiner—Howard S. Williams
Attorney, Agent, or Firm—Richard N. James

[57] ABSTRACT

Hydrogen and oxygen are produced from water in a process involving the photodissociation of molecular bromine with radiant energy at wavelengths within the visible light region.

10 Claims, 3 Drawing Figures

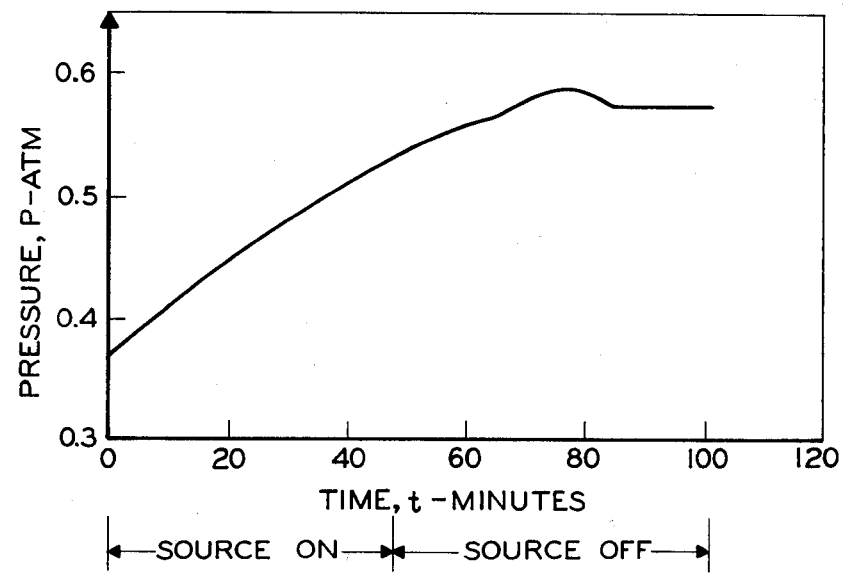
FIG. 2  PRESSURE AS A FUNCTION OF TIME
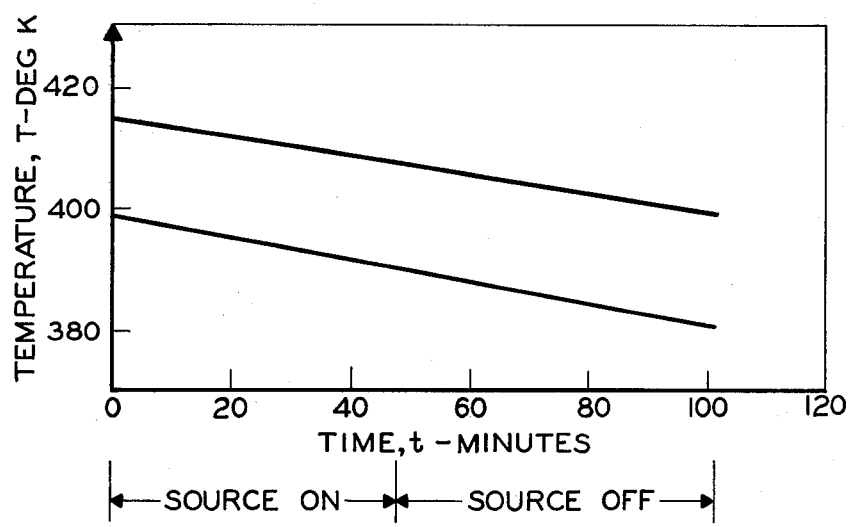
FIG. 3  TEMPERATURE AS A FUNCTION OF TIME

PHOTOLYTIC PRODUCTION OF HYDROGEN

The invention described herein was made in the course of a contract with the National Aeronautics and Space Administration.

BACKGROUND OF THE INVENTION

The present invention relates in general to photolytic processes and is directed, more specifically, to the production of hydrogen and/or oxygen from water utilizing a photolytic process.

The concept of employing hydrogen as a fuel is attractive because it is abundant and nonpolluting. Unfortunately, although it is abundant it is not readily available in the molecular state and, in order for it to become a viable fuel satisfying significant future energy requirements, means for producing it in vast quantities in an economic manner will have to be identified and demonstrated.

Past technologies for the production of hydrogen, including the electrolysis of water or processing of fossil fuels, have typically required the expenditure of large amounts of energy usually from sources fueled by expendable materials.

In recent years some attention has been given to the production of hydrogen in closed-cycle, multistep, thermochemical processes for cracking water. However, the direct thermal decomposition of water requires temperatures in excess of 2500° K. Furthermore, separation of the products, hydrogen and oxygen, is extremely difficult.

The direct photodecomposition of water requires radiation in the ultraviolet spectral region at wavelengths well below 2000 A. However, suitable intense ultraviolet light sources are not readily available nor are the materials which are readily transparent to such ultraviolet radiation.

What is really required is a practical means of producing hydrogen in a process that does not involve the unrealistic expenditure of our natural nonregenerable resources.

SUMMARY OF THE INVENTION

The present invention involves a process for the production of hydrogen from water utilizing radiant energy within the visible light spectrum in a series of low-temperature photolytic or thermal reactions.

The overall reaction utilizes halogens, and an overall reaction describing one embodiment of the process may be expressed as:

$$Br_2 + I_2 + H_2O \rightleftharpoons H_2 + Br_2 + I_2 + \tfrac{1}{2} O_2$$

Individually the preferred reactions are depicted as follows:

$$Br_2(G)^* \underset{}{\overset{hv^{**}}{\rightleftharpoons}} 2Br(G)$$

$$H_2O(G) + 2Br(G) \rightleftharpoons 2HBr(G) + \tfrac{1}{2} O_2(G)$$

$$I_2(G) \underset{}{\overset{hv}{\rightleftharpoons}} 2I(G)$$

$$HBr(G) + 2I(G) \rightleftharpoons HI(G) + IBr(G)$$

$$2 IBr(G) \underset{}{\overset{hv}{\rightleftharpoons}} I_2(G) + Br_2(G)$$

$$2 HI(G) \underset{}{\overset{hv}{\rightleftharpoons}} H_2(G) + I_2(G)$$

*(G) indicates gas phase
**(hv) indicates radiant energy

There are many advantages to the invention and significant differences from the past technology including the following:

1. a source of high temperature heat is not required,
2. visible light is effective in promoting desired photolytic reactions such light being available from many sources including the sun,
3. optics or other concentrators are not required,
4. a large percentage of the total solar flux can be used to effect the reactions, and the products are easily separated.

Figure 1:
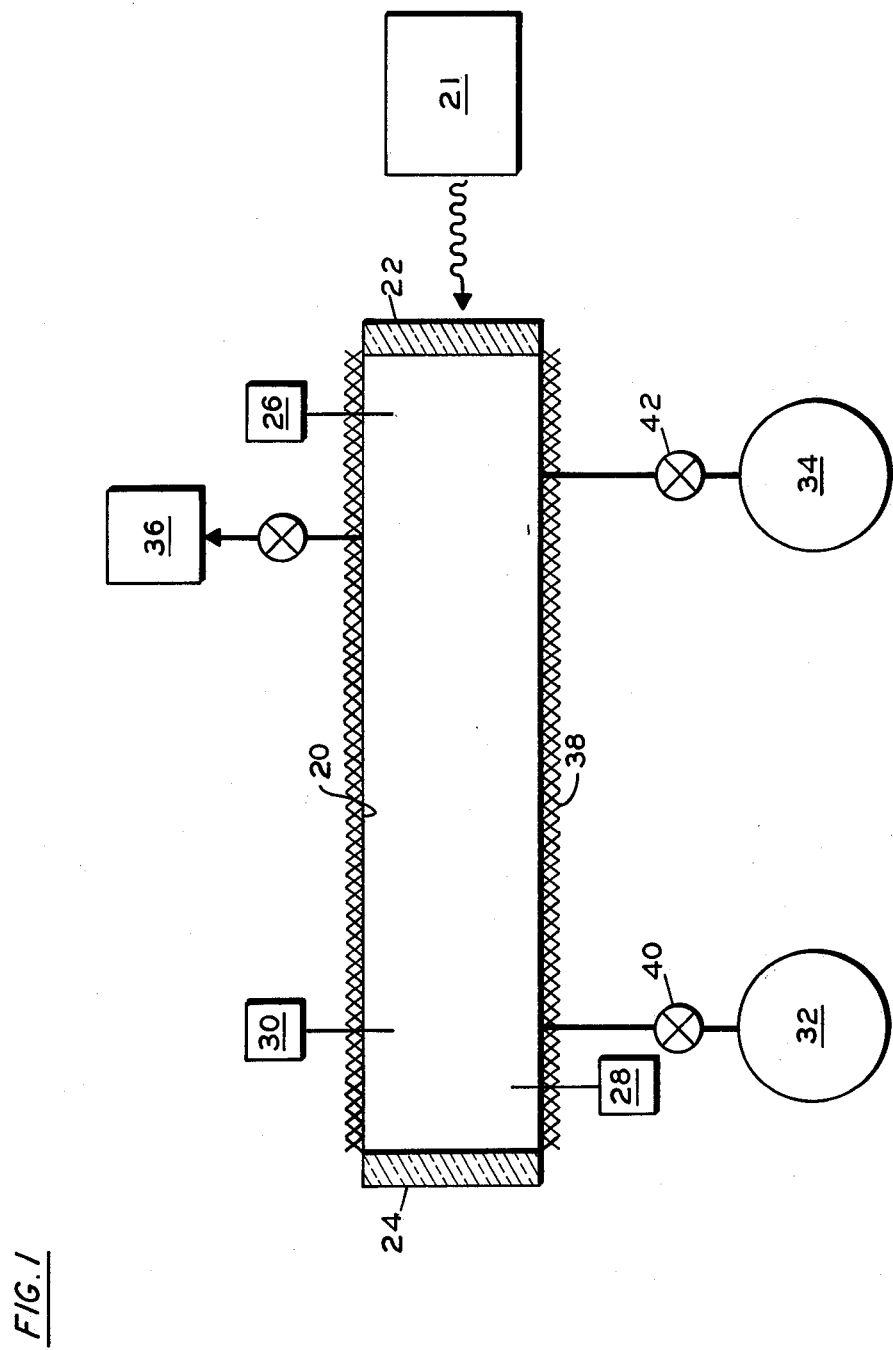
FIG. 1 is a schematic of the apparatus used to verify the ability of visible light to produce the reaction.

$$Br_2(G) + H_2O(G) \underset{}{\overset{hv}{\rightleftharpoons}} 2HBr(G) + \tfrac{1}{2} O_2(G)$$

FIG. 2 is a graph of pressure versus time in the above reaction.

FIG. 3 is a graph of temperature versus time in the above reaction using the apparatus of FIG. 1, as hereinafter described.

DESCRIPTION OF THE PREFERRED EMBODIMENTS

Closed cycle processes are extremely attractive and such a process is herein described as a preferred embodiment. In the process intermediate species are regenerated without loss and the only pollutant is degraded heat.

The specific process to be discussed is summarized as follows:

(1) 
$$Br_2(G) \underset{}{\overset{hv}{\rightleftharpoons}} 2Br(G)$$
$$H_2O(G) + 2Br(G) \rightleftharpoons 2HBr(G) + \tfrac{1}{2} O_2(G)$$

(2)
$$I_2(G) \underset{}{\overset{hv}{\rightleftharpoons}} 2I(G)$$
$$HBr(G) + 2I(G) \rightleftharpoons HI(G) + IBr(G)$$

(3)
$$2IBr(G) \underset{}{\overset{hv}{\rightleftharpoons}} I_2(G) + Br_2(G)$$
$$2HI(G) \underset{}{\overset{hv}{\rightleftharpoons}} H_2(G) + I_2(G)$$

In reaction (1) gaseous molecular bromine and water are allowed to react at approximately 373° K in the presence of radiation (3650–5350 A.) to yield gaseous hydrogen bromide (HBr) and oxygen ($O_2$).

Hydrogen bromide is separated by dissolution in a HBr/$H_2O$ mixture up to a concentration of about 87% HBr/13% $H_2O$ (by weight). Since oxygen is relatively insoluble in water, the hydrogen bromide/oxygen separation is effected.

Hydrogen bromide is not readily dissociated at temperatures below approximately 1500° K and forms a constant boiling mixture with water at about 47% HBr which boils at 399° K. Distillation of the HBr/H₂O mixture drives off HBr which is collected until the concentration of HBr in water reaches 47%.

As shown in reaction (2) the collected HBr is allowed to react with iodine (I₂) at 456° K in the presence of radiation (4300 A – 7400 A) to yield gaseous hydrogen iodide (HI) and iodine monobromide (IBr), some unreacted HBr remaining.

Cooling the reaction mixture below the boiling point of the iodine monobromide permits the separation of the liquid IBr from the gaseous hydrogen iodide and unreacted hydrogen bromide.

Iodine and bromine may be regenerated from the iodine monobromide by decomposition of the monobromide at a temperature of about 700° K or photolytically in the visible spectral region (reaction 3).

The hydrogen iodide/unreacted hydrogen bromide mixture resultant from the reaction 2 operation is heated to about 700° K to thermally decompose the hydrogen iodide to hydrogen and, iodine. The hydrogen bromide is not dissociated at this temperature. Upon quenching to a temperature below 456° K, the iodine is liquified and separated from the hydrogen and hydrogen bromide. Finally, the solubility of hydrogen bromide in water is utilized, as previously described, to effect separation of the hydrogen and hydrogen bromide.

In the case of solar energy as the radiation source:
1. about 21 percent of the total solar flux is usable to effect reaction (1);
2. about 30 percent of the total solar flux is available to effect reaction (2); and
3. about 30 percent of the total solar flux can be used for reaction (3).

The reaction sequence is not Carnot limited in the sense that photolytic dissociation does not depend on temperature as is the case with reactions associated with a Carnot cycle. Furthermore, the reactions depend only upon the photon flux (photons/cm²/sec.) thus, apparatus to effect a concentration of radiation is not required.

If it is assumed that:
1. The fractional flux of solar energy incident at the earth's surface available for the dissociation of molecular bromine is about $1.56 \times 10^{-2}$ watt/cm²;
2. The fractional flux available for the dissociation of iodine is about $3.7 \times 10^{-2}$ watt/cm²;
3. and one photon leads to the production of 2 mols of hydrogen bromide according to reaction (1), and that reaction is the limiting factor, then illumination by solar radiation over an 8 hour day would produce a hydrogen equivalent equal to 414 BTU/ft²/day.

Another radiation source capable of providing radiation of the desired wavelength is the plasma core reactor. A typical plasma core reactor radiates about $3 \times 10^2$ watt/cm² (effective black body radiating temperature of 4000° K) at wavelengths between 3300 A and 5300 A. Over a 24 hour day, radiation of this magnitude would produce a hydrogen equivalent of about $2 \times 10^7$ BTU/ft²/day. For radiating temperatures of 4000° K and 6000° K, approximately 25 percent and 45 percent, respectively, of that spectral flux is available for use in the bromine and iodine photodissociation reactions.

Alternative approaches in the basic equations are, of course, possible. The following is an example.

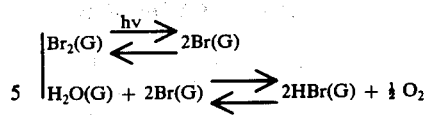

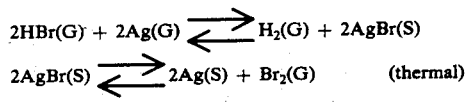

The above is the same as reaction (1) in the preceding process.

Then

In this case the hydrogen is directly separated from the hydrogen bromide.

In all of the foregoing the key to the concept is the use of halogens to react with water through the use of radiation having a substantial portion of its spectrum in the visible light region thereby forming the corresponding hydrogen halide and oxygen or an oxygen species.

Verification of the reaction $$H_2O + Br_2 \xrightleftharpoons{h\nu} 2HBr + \tfrac{1}{2} O_2 \qquad (1)$$

was made utilizing the apparatus set forth in FIG. 1.

This apparatus was a 6.4 cm diameter by 30 cm. long reaction cell (20) havng Pyrex (22 and 24) windows fused to both ends. A tungsten-iodine filament lamp (21) was utilized as the source of radiation.

Pressure and temperature traces for the 100-minute time period of the experiment are shown in FIGS. 2 and 3, respectively, as functions of time. During the period of irradiation (about 48 minutes), a pressure increase was noted; the cell pressure increased from 0.36 atm to about 0.52 atm (FIG. 2). The cell pressure was also observed to increase slightly over the next 30-minute period after the radiation source had been extinguished. The pressure during this period increased from about 0.52 atm to approximately 0.56 atm and remained effectively constant thereafter until conclusion of the experiment (about 100 minutes).

Temperature traces for the two thermocouples 26 and 28 as a function of time for the corresponding time span of the experiment are illustrated in FIG. 3.

The data of FIG. 3 indicates an average decrease in cell temperature over the time span of the experiment. The straight line curves in FIG. 3 are least squares determinations of the temperature data for the two thermocouples.

The increasing cell pressure with a corresponding decrease in temperature indicates that a reaction between water and bromine had occurred with an attendant increase in pressure.

Temperature and pressure monitoring were accomplished by means of the two chromel-alumel thermocouples and an absolute pressure transducer (30).

Two 100 ml flasks 32 and 34 were installed on the cell and served as reservoirs for liquid water and bromine as shown in FIG. 1. In addition, a vacuum pump 36 was installed to permit evacuation of the cell as required. The cell and various components were heated with variac-controlled, electrical tapes 38.

The entire apparatus was placed in a hood because of the corrosiveness of bromine.

Equi-molar quantities of liquid water and bromine were measured with hypodermic syringes and introduced into the 100 ml reservoirs. The quantities were such that total evaporation of both the water and bromine would yield a cell pressure of about 0.5 atm prior to reaction. The liquids in the reservoirs were sealed off from the reaction cell by means of stopcocks 40 and 42. Subsequently, the liquids (water and bromine) were frozen out with liquid nitrogen and the entire system (reaction cell and reservoirs) evacuated with the vacuum pump. After evacuation of the system, the system was isolated from the pump and the water and bromine were allowed to thaw. Finally, the cell and reservoirs were heated to about 400° K. At 400° K, the cell pressure attained a value of about 0.36 atm prior to irradiation. Failure to attain a predetermined pressure of 0.5 atm was due largely to inability to accurately measure the volume of liquid bromine introduced into the system initially.

After attainment of equilibrium with respect to temperature and pressure, irradiation of the reaction mixture was initiated with concurrent monitoring of cell pressure and temperature. The reaction mixture was irradiated for about 48 minutes. Pressure and temperature were monitored for a total of approximately 100 minutes.

Table I illustrates the characteristics of various species discussed herein.

TABLE I

| Species | Dissociation Energy ev | nm | Melting Point °K(°C) | Boiling Point °K(°C) | Solubility g/100 g $H_2O$ |
|---|---|---|---|---|---|
| $I_2$ | 1.542 | 804 | 387(114) | 456(183) | 0.034 |
| $Br_2$ | 1.971 | 629 | 265.7(−7.3) | 331.8(58.8) | 15.5 |
| $Cl_2$ | 2.475 | 501 | 171(−102) | 239.3(−33.7) | 0.64 |
| HI | 3.056 | 406 | 222.2(−50.8) | 237.6(−35.4) | ~2.5 |
| HBr | 3.754 | 330 | 184.5(−88.5) | 206(−67) | 194 |
| HCl | 4.430 | 280 | 161(−112) | 189.3(−83.7) | 69.8 |
| $H_2$ | 4.553 | 272 | 18.8(−254.2) | 20.2(−252.8) | negl. |
| $O_2$ | 5.080 | 244 | 54.6(−218.4) | 90(−183.0) | negl. |
| $H_2O$ | 5.12 | 242 | 273(0) | 373(100) | — |

Although the invention has been shown and described with respect to preferred embodiments thereof, it should be understood by those skilled in the art that the foregoing and various other changes and omissions in the form and detail thereof may be made therein without departing from the spirit and scope of the invention.

Having thus described typical embodiments of my invention, that which I claim as new and desire to secure by Letters Patent of the United States is:

1. In the production of hydrogen from water the improvement which comprises:
   as an essential step thereof forming a water-halogen gas mixture and irradiating the mixture with radiation energy in the visible spectrum to form the corresponding hydrogen halide and processing the hydrogen halide to effect the release of hydrogen therefrom.

2. A process for producing hydrogen from water which comprises:
   forming a water-halogen gas mixture, dissociable in the presence of radiation in the visible spectrum;
   irradiating the water-halogen gas in mixture with radiation in the visible spectrum, forming the corresponding hydrogen halide and oxygen;
   separating the hydrogen halide from the oxygen;
   processing the hydrogen halide to effect the release of hydrogen therefrom.

3. The process according to claim 2 wherein the halogen is bromine.

4. A process for producing hydrogen from water which comprises:
   forming a water-bromine gas mixture;
   irradiating the water-bromine gas mixture with radiation in the visible spectrum to form, in that reaction, hydrogen bromide and other species;
   separating the hydrogen bromide from the other species;
   forming a hydrogen bromide-iodine gas mixture;
   irradiating the hydrogen bromide-iodine gas mixture with radiation within the visible spectrum to form, in the reaction, hydrogen iodide; and
   decomposing the hydrogen iodide to effect the release of hydrogen therefrom.

5. The process according to claim 4 wherein the source of radiation is sunlight.

6. The process according to claim 4 wherein the source of radiation is a gaseous nuclear reactor.

7. A process for producing hydrogen from water which comprises:
   forming a water-bromine gas mixture at a temperature of at least 373° K;
   irradiating the water-bromine gas mixture with radiation in the wavelength range of about 3650A–5350A;
   forming hydrogen bromide and oxygen;
   separating the hydrogen bromide from the oxygen by dissolution of the hydrogen bromide in water;
   isolating the hydrogen bromide and reacting it with iodine at a temperature of at least 456° K in the presence of radiation in the wavelength range of about 4300A–7400A, yielding hydrogen iodide and iodine monobromide;
   cooling the mixture to liquify the iodine monobromide and separating the liquid monobromide from the gaseous hydrogen iodide; and
   decomposing the hydrogen iodide yielding hydrogen and iodine.

8. The process according to claim 7 which includes the additional step of regenerating the iodine and bromine by decomposition of the iodine monobromide.

9. The process according to claim 8 wherein the decomposition of the iodine monobromide is by thermal treatment.

10. The process according to claim 7 wherein the decomposition of the hydrogen iodide is by a thermal treatment.